C. W. & W. W. MARSH.

Harvester.

No. 6,330.

Reissued March 9, 1875.

Witnesses:
Henry A. Sardine Jr
O. W. Bond

Inventors.
Chas W. Marsh
Wm. W. Marsh
By Wm H Bond Attys

N. PETERS, PHOTO-LITHOGRAPHER, WASHINGTON, D. C.

UNITED STATES PATENT OFFICE.

CHARLES W. MARSH AND WILLIAM W. MARSH, OF SYCAMORE, ILLINOIS.

IMPROVEMENT IN HARVESTERS.

Specification forming part of Letters Patent No. 21,207, dated August 17, 1858; reissue No. 1,719, dated July 5, 1864; reissue No. 2,014, dated June 27, 1865; extended seven years; reissue No. 6,330, dated March 9, 1875; application filed February 3, 1875.

DIVISION B.

*To all whom it may concern:*

Be it known that we, CHARLES W. MARSH and WILLIAM W. MARSH, form rly of Shabbona, in the county of De Kalb and State of Illinois, now of Sycamore, in said county and State, have invented certain new and useful Improvements in Harvesters; and we do hereby declare that the following is a full, clear, and exact description of that part of said invention which is claimed in this division, reference being had to the accompanying drawings, making a part of this specification, in which—

Figure 1:
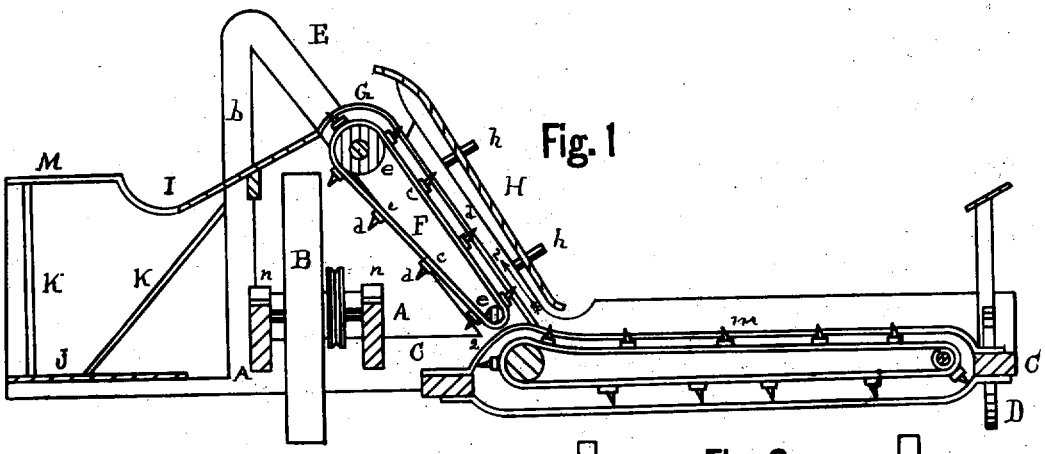
Figure 2:
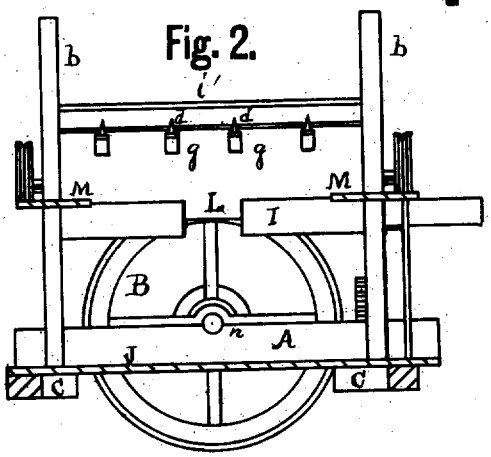
Figure 3:
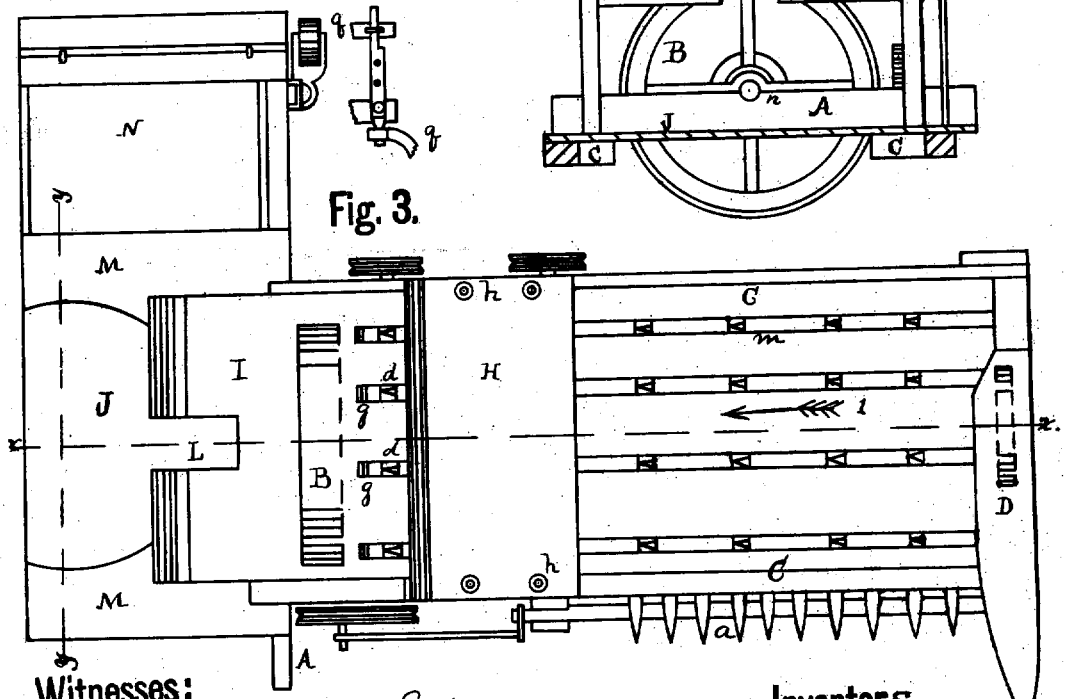

Figure 1 is a longitudinal vertical section taken on line *x x* of Fig. 3; Fig. 2, a transverse vertical section on line *y y* of Fig. 3, and Fig. 3 a plan or top view.

Similar letters of reference indicate corresponding parts in all of the figures.

This invention relates to that class of harvesting-machines in which binders ride and bind; and its nature consists in the construction and arrangement of the several parts of the machine, so that the weights of the attendants will counterbalance each other, and also counterbalance a corresponding portion of the weight of the carrier and elevator, as hereinafter described.

To enable others skilled in the art to make and use this part of our invention, we will proceed to describe the same.

The frame-work of the machine consists of a main frame, A, in which the drive-wheel is placed, a grain-carrier frame, C, an elevator-frame, E, and a binders' frame or platform, J. The frame A is supported by suitable bearings *n* on the drive-wheel B. The carrier-frame C is connected with the main frame A, so as to occupy a position on the inside or grain side of the drive-wheel, while the binders' stand or platform J is connected with the main frame A on the opposite or outer side of the drive-wheel. The inclined frame E of the elevator is attached at its lower end to the carrier-frame C at 2, Fig. 1, and its upper end is supported by the standards or uprights *b b*, and bridges the space over the drive-wheel, and connects the carrier with the binders' stand or platform J, and with the grain-receiver. The sickle *a* is placed in front of the carrier-frame C, and is an ordinary reciprocating sickle, and is operated from the drive-wheel in any ordinary way. Within the frame C a carrier or endless band of rakes is placed, which carries the cut grain in the direction of the arrow 1. Within the frame E is placed the elevating mechanism, which is provided with a loose or yielding cover, H. This elevator carries the grain in the direction of the arrow 2, and delivers it upon the elevated receptacle I. The carrier and elevator are both connected with the drive-wheel by suitable gearing and belts to give them the necessary movements. The drive-wheel B is located about midway between the ends of the frame A, as shown by the dotted lines in Fig. 3, and has its bearings at *n n* on said frame, so as to nearly or quite balance the frame, front and rear, as well as sidewise, and so as to be in the line of the path or travel of the grain as it moves from the carrier *m* to the receiver I. The binders' stand or platform J is attached to the outer side of the frame A. M M are the binders' tables, which are arranged on the outer side of the drive-wheel, and on opposite sides of its axis, as shown. They are not more fully described here, as they form, in their combination with the receiver and the binders' stand, the principal subject-matter of our reissue No. 2,015. D is an ordinary grain-wheel, and N is a sheaf-gatherer or dumping-box. Near the inner rear corner of this box is placed a caster-wheel, *q*, the stem of which is provided with a series of holes, so that the wheel can be raised or lowered to act as a safety-wheel or a bearing-wheel, as may be desired.

The greater length of the frame C, with the weight of the grain-wheel D, balances the shorter length of the frame or platform J and the weight of the binders, with a sufficient overbalance to keep the machine in proper position for use. The main frame A, the carrier-frame C, and the frame supporting the platform J are practically but one frame, as shown, within which the drive-wheel has its journal-bearings, and upon which the frame E is mounted. This greatly simplifies the construction and operation of all of the parts connected with the carrying, elevating, and binding of the grain, and adds much to its efficiency in use.

In operation the machine is drawn forward and the cut grain falls upon the carrier *m*, by which it is carried toward the elevator, to which it is delivered in a continuous stream, which is elevated or carried up and delivered onto the receptacle I at a convenient height for the attendant binder or binders. The attendants stand on the platform J, and take sheaves from the receptacle I as they collect there, and bind them on tables M M.

The machine is arraged for two binders, one in front of the axis of the drive-wheel, and one in rear, so that each binder counterbalances the other when at work at their respective tables. The weight of the binders also balances a corresponding weight in the carrying and elevating apparatus on the inside of the drive-wheel; and by thus bringing the weight of the binders and the binders' supports, together with a corresponding counterbalancing-weight on the opposite side, directly onto the bearings of the drive-wheel, we increase the traction of the wheel to a corresponding extent, which is important, as the drive-wheel has not only to drive the sickle and reel, but must also operate the carrier and elevate the grain high enough to be bound with facility by men riding on the machine.

What we claim as new, and desire to secure by Letters Patent in this division of reissue, is as follows:

1. The combination of the binders' stand on the outside of the drive-wheel, and a grain-carrier on the opposite side, with the intermediate drive-wheel, elevator, and grain-receiver, all arranged in line, substantially as and for the purposes specified.

2. In combination with the binders' stand on the outside of the drive-wheel, and a grain-carrier on the opposite side, and the intermediate drive-wheel, elevator, and grain-receiver, arranged in line therewith, the elevated binders' tables, one in front and one in rear of the axis of the drive-wheel, substantially as described.

CHARLES W. MARSH.
WILLIAM W. MARSH.

Witnesses:
ARTHUR M. STARK,
CHARLES W. MOSHER.